United States Patent
Zhou

(10) Patent No.: US 7,038,923 B2
(45) Date of Patent: May 2, 2006

(54) METHOD OF ESTABLISHING A MASTER & MINUS; HOST IN MODULES CONNECTING IN PARALLEL

(75) Inventor: Dangsheng Zhou, Guangdong (CN)

(73) Assignee: Emerson Network Power Co., Ltd., Guangdong (CN)

( * ) Notice: Subject to any disclaimer, the term of this patent is extended or adjusted under 35 U.S.C. 154(b) by 2 days.

(21) Appl. No.: 10/500,452

(22) PCT Filed: Dec. 31, 2002

(86) PCT No.: PCT/CN02/00945

§ 371 (c)(1),
(2), (4) Date: Jun. 29, 2004

(87) PCT Pub. No.: WO03/058802

PCT Pub. Date: Jul. 17, 2003

(65) Prior Publication Data

US 2005/0041445 A1     Feb. 24, 2005

(30) Foreign Application Priority Data

Dec. 31, 2001   (CN) .............................. 01 1 30177

(51) Int. Cl.
*H02M 7/00*   (2006.01)
*H02M 7/02*   (2006.01)

(52) U.S. Cl. ......................... 363/72; 363/69
(58) Field of Classification Search .................. 363/72, 363/71, 69, 70
See application file for complete search history.

(56) References Cited

U.S. PATENT DOCUMENTS

| | | | | |
|---|---|---|---|---|
| 4,328,429 A | * | 5/1982 | Kublick | 307/58 |
| 4,886,981 A | * | 12/1989 | Lentini et al. | 307/87 |
| 5,751,150 A | * | 5/1998 | Rippel et al. | 324/537 |
| 6,141,231 A | * | 10/2000 | Brkovic | 363/72 |
| 6,169,679 B1 | * | 1/2001 | Deng et al. | 363/72 |
| 6,285,572 B1 | * | 9/2001 | Onizuka et al. | 363/72 |
| 6,788,559 B1 | * | 9/2004 | Sheng et al. | 363/72 |

FOREIGN PATENT DOCUMENTS

| | | |
|---|---|---|
| CN | 1048344 | 1/2000 |
| EP | 0425194 | 5/1991 |
| WO | WO 9843163 | 10/1998 |

* cited by examiner

*Primary Examiner*—Bao Q. Vu
(74) *Attorney, Agent, or Firm*—Ladas & Parry LLP

(57) ABSTRACT

This invention relates to a method of establishing a master unit in a multi-unit parallel system. Each module with a respective number is connected through a bus, and has a different host-identifying pulse width Ts and a host-releasing pulse width Tw. According to the respective numbers, each module sends its host-identifying pulse to the bus and receives the feedback pulse, and then establishes a master unit among all of modules after comparing the feedback pulse width Tr and the host-releasing pulse width Tw. This method effectively realizes a decentralized controlling strategy for phase synchronization in a parallel inverter system and ensures that only one master unit exists in the parallel system. The connection of the multi-string parallel signal bus is simple, and can be connected in circle to provide the redundancy. Compared with the prior art, it is much simple in structure and flexible in configuration and adjustment, and has more reliability and real-time capability.

9 Claims, 3 Drawing Sheets

(a) Completely Overlapped    (b) Completely Staggered

US 7,038,923 B2

METHOD OF ESTABLISHING A MASTER & MINUS; HOST IN MODULES CONNECTING IN PARALLEL

TECHNICAL FIELD

The present invention relates to the power supply technology. More particularly, it relates to a method for establishing a master unit in a multi-unit parallel system, especially a parallel system composed of a plurality of modules (e.g. inverters) operating in parallel.

BACKGROUND OF THE INVENTION

In a parallel system composed of multiple parallel-connected modules (e.g. inverters), AC outputs from respective inverters are connected in parallel for jointly providing energy for a load so as to improve the capacity or reliability of the system. To ensure reliable operation of the parallel inverter system, the amplitudes of the respective inverters should be the same and the phases should be synchronized. Otherwise, high circulating current may occur between the parallel-connected inverters, thereby resulting in overload or damage of the inverters.

In a decentralized parallel inverter system, in order to ensure the phase synchronization among the respective inverters, one of the inverters needs to be set as a master unit while the others act as slave units. The master unit can act as the frequency source for the output voltage of the entire parallel inverter system, and the slave units track the phase of the output voltage of the master unit. For instance, when the bypass power source fails or goes abnormal in a parallel UPS system, every inverter loses the common tracking source. This requires adopting a control strategy of determining a master and slave units, i.e., establishing only one master unit to maintain the phase synchronization of all the inverters.

In such a decentralized controlling strategy, it requires one and only one master unit employed in the system. The reason is as follows: if no master unit exists in the parallel inverter system, each inverter can track the output phase of the system and maintain substantially the phase synchronization of the inverters. However, the entire parallel inverter system is in the state of self-excited oscillation such that the ultimate output frequency of the system will be diverted from the nominal value. If multiple master units exist in the parallel inverter system, each master unit serves as the frequency source of the system and generates output voltage according to the respective nominal values. Since dispersion exists inevitably between the respective nominal frequency oscillators a significant phase difference will occur over time in the output voltage of the respective inverters no matter if the initial state is the same or not, thereby leading to the failure of the parallel connection. In addition, the master unit herein may also be used for time sequential controls in the parallel inverter system.

In the aforesaid phase synchronization strategy, in order to ensure the existence and uniqueness of the master unit, a number of methods are provided as follows:

(1) The master unit is set manually. A disadvantage of this method is that it is not flexible. The manually set inverter has to be turned on before the parallel inverter system operates. While a fault occurs in the inverter, the parallel inverter system composed of the rest inverters cannot run properly before a new master unit is set.

(2) As illustrated in FIG. 1, the master unit determination relies on the netlike parallel signal cables laid among the inverters. Any of the inverters can detect and identify the state of other inverters. However, a disadvantage of this method is that, due to the netlike parallel signal connection among the inverters, the connection cables become complicated when large number of inverters is used.

(3) As illustrated in FIG. 2, the master unit determination relies on the the serial communication among the inverters. The communication line used between the inverters may be RS485, CAN bus, etc. However, a drawback of this method lies in the unsatisfied real time capability and reliability.

In addition to parallel inverter system, the parallel rectifier system and some master-slave communication system such as RS485 network require establishing the master unit as well.

SUMMARY OF THE INVENTION

The technical problem for the present invention to solve is to provide a method of establishing a master unit in a parallel module system for a multi-module system using a decentralized controlling strategy. It overcomes the drawbacks of the prior art in establishment of a master unit, that is, the structural complicacy, inflexibility, low reliability, complicacy of connection and poor real time capability, etc.

In order to solve the aforesaid technical problems, the present invention is to provide a method to establishing a master unit in a system composed of multiple modules connected in parallel, characterized in that each module in the parallel system is marked with a respective number and connected by at least one contention bus. The modules with respective numbers have different host-identifying pulse width Ts and host releasing pulse width Tw. According to the numbers, each module sends a corresponding host-identifying pulse width to the contention bus under some condition. At the same time, it receives the feedback pulse from the contention bus, and subsequently a master unit is established among all modules by comparing the feedback pulse width Tr and its host-releasing pulse width Tw.

In the above method of the present invention for establishing a master unit, the contention bus is a logical OR bus. Each module is initially defaulted as a slave unit and sends an invalid low level to the contention bus.

In the aforesaid method of the present invention for establishing a master unit, each module sends the host-identifying pulse to the contention bus to ensure that only one master unit exists in the parallel system. All modules that have not started up or been turned off are initially set as slave units and send invalid low levels to the contention bus. All modules that have started up send the host-identifying pulses to the contention bus and detect the feedback pulse width Tr from the contention bus. If the feedback width Tr is smaller than the host-identifying pulse width Tw of the module, the module is set as a master unit. If the feedback width Tr is larger than the host-identifying pulse width Tw of the module, the module is set as a slave unit.

In the aforesaid method of the present invention for establishing a master unit, the contention bus comprises a first contention bus and a second contention bus. Each module is initially defaulted as a slave unit and sends an invalid low level to both of the contention buses.

In the above method of the present invention having two contention buses for establishing a master unit, in order to ensure the existence of the master unit, each module sends a low level to the first and second contention bus, including the following steps: all modules that have not started up or been turned off are set as slave units, and all of these modules that act as slave units send low levels to the first contention bus, while the module that serves as the master unit sends a high level to the first contention bus; each module started up detects the feedback level from the first contention bus, and the module is set as a master unit if the detected feedback level is low; if the detected feedback level is high and the module is still a slave unit, then the module remains as a slave unit; if the detected feedback level is high and the module is already set as a master unit, then the master unit performs the step to send the host-identifying pulse to the second contention bus to ensure that the master unit is unique as described below.

In the aforesaid method of the present invention for establishing a master unit, the step in which the master unit module sends the host-identifying pulse to the second contention bus to ensure that the master unit is unique further comprises: according to its number, the master unit sends periodically host-identifying pulses to the second contention bus; the master unit detects the feedback pulse from the second contention bus and records the detected feedback pulse width Tr in real time; if the feedback pulse width Tr from the second contention bus is smaller than the host-removed pulse width Tw of the master unit module, then the module remains as the master unit; otherwise, the module is released from the master state and reset as a slave unit.

In the aforesaid method of the present invention for establishing a master unit, the first and second contention bus are simple logical OR buses. At the same time, each module has a first contention logic and a second contention logic.

In the above-mentioned method of the present invention for establishing a master unit, each module sends a logic level to the first contention bus by using the first contention logic associated with the first contention bus. Each module sends a host-identifying pulse to the second contention bus and detects the second contention bus by using the second contention logic associated with the second contention bus. The first contention logic and the second contention logic can be realized by a digital circuit, such as a trigger based circuits, or a microprocessor and programmable logic device.

In the aforesaid method of the present invention for establishing a master unit, the number of the module corresponds to a priority. The host-identifying pulse width Ts of the module with a high priority is larger than the sum of the host-identifying pulse width Ts of the modules with lower priorities, and is larger than the host-releasing pulse width Tw of any of the modules with lower priorities. The host-releasing pulse width Tw of each module other than the one with the highest priority is larger than the sum of the host-identifying pulse width Ts of the module and the host-identifying pulse width Ts of the modules with lower priorities. At the same time, the host-releasing pulse width Tw of a high priority module is larger than the host-releasing pulse width Tw of the modules with lower priorities.

In the aforesaid method of the present invention for establishing a master unit, the module established as the master unit can be used to control the frequency source of the output voltage of the entire parallel module system under certain conditions, while the slave units other than the one established as master unit may track the output voltage phase of the master unit.

Application of the method of the present invention for establishing a master unit in a parallel module system can be effectively carried out in the above-described phase synchronization strategy of the third decentralized control. The method of the present invention for establishing a master unit in a parallel module system presents a novel and simple master-slave contention bus such that it can ensure one master unit, and only one master unit, exists. In such a master-slave contention parallel module system, each module has different numbers and a multi-core parallel signal bus is provided therebetween. Unlike the netlike parallel signal line, the connection of this multi-string parallel signal bus is simple, and can be connected in circle to provide redundancy. Compared with the prior art, it is much simple in structure and flexible in configuration and adjustment, and has more reliability and real-time capability.

DETAILED DESCRIPTION OF THE INVENTION

Figure 1:
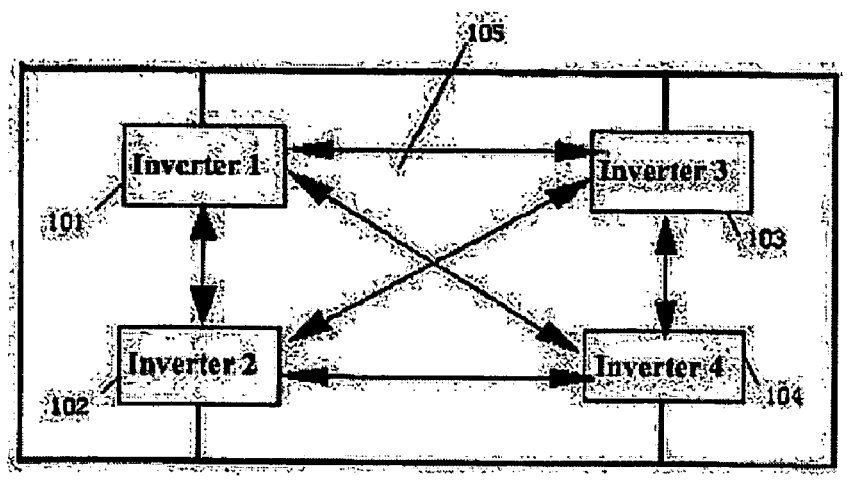
FIG. 1 is a schematic diagram of a parallel module system in the prior art using the master-slave decentralized controlling strategy, in which the master unit is determined through the netlike parallel signal lines.
Figure 2:
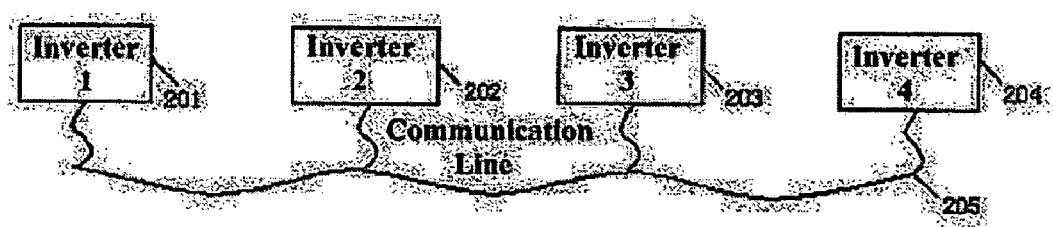
FIG. 2 is an illustrative diagram of a parallel module system in the prior art using the master-slave decentralized controlling strategy, in which the master unit is determined through the serial communication line between the modules.
Figure 3:
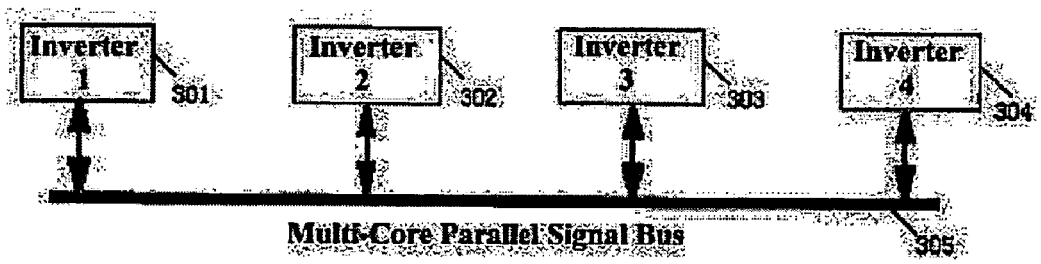
FIG. 3 is a schematic diagram showing the method for establishing the master unit in accordance with the parallel module system of the present invention.

The principle of the present invention is illustrated in FIG. 3. The method of the present invention is based on a multi-string parallel signal cable 305 connecting modules 301, 302, 303 and 304. Here inverter modules are taken as an example. In order to establishing a master unit, the application of the method of the present invention is based on the master-slave contention bus and corresponding master-slave contention logic.

Figure 4:
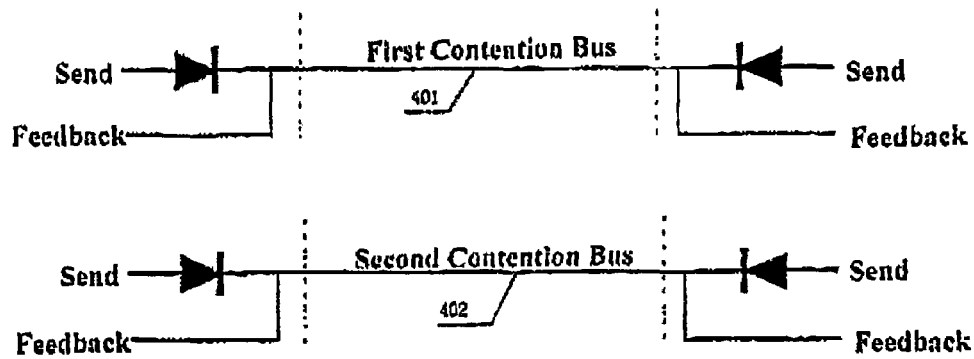
FIG. 4 is a schematic diagram of the construction of the contention buses in accordance with the present invention.

As an embodiment of the contention bus of the present invention, the master-slave contention bus is composed of two logical OR buses in the multi-string parallel signal cable 305 illustrated in FIG. 3, which may be referred to as a first contention bus 401 and a second contention bus 402, as illustrated in FIG. 4. The master-slave contention logic is disposed in the control logic (not shown) of the respective modules (e.g. inverters) and defined as a first contention logic and a second contention logic, which corresponds to the first contention bus 401 and the second contention bus 402 respectively.

Figure 5:
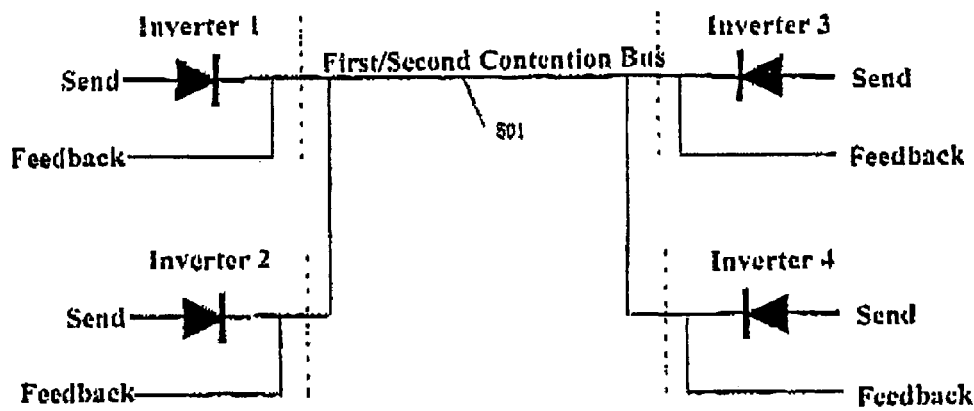
FIG. 5 is a schematic diagram of the contention bus with four modules in accordance with the first embodiment of the present invention.
Figure 6:
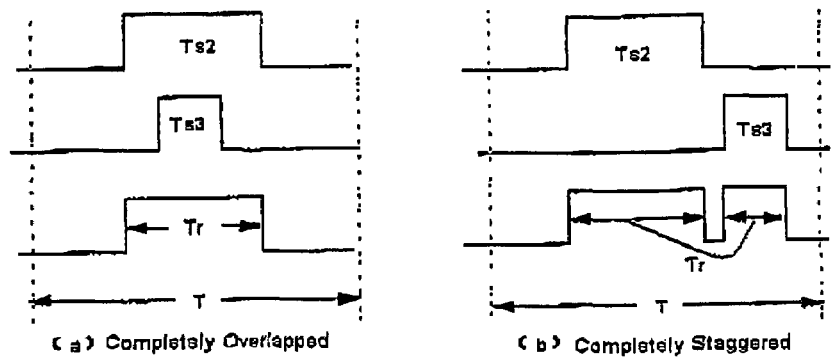
FIG. 6 is an illustrative diagram showing the relationship between the two host-identifying pulses.

FIG. 5 illustrates the first embodiment of the present invention, wherein the parallel module system comprises four modules. The detailed operation of the master-slave contention device and the master unit establishing process are as follows:

(1) Initial state: Each module is initially defaulted as a slave unit and sends an invalid low level to the first contention bus and the second contention bus.

(2) The first contention logic of each module is as follows:
  A. Each module that has not started up or turned off are set as a slave unit;
  B. Each slave unit sends a low level to the first contention bus, while the module that serves as the master unit sends a high level to the first contention bus;
  C. Each module that has started up detects the feedback level from the first contention bus. If the feedback level is low, the module is set as a master unit. If the feedback level is high and the module is a slave unit, the module remains as a slave unit. If the feedback level is high and the module is set as a master unit, a further process will be performed in accordance with the second contention logic.
(3) The second contention logic is as follows:
  As described above, each module in the parallel module system has a respective number. According to the numbers, the modules have two types of characteristic pulses, that is, host-identifying pulse and host-releasing pulse with the respective width of Ts and Tw. Both have the period of T. Their functions are described as follows:
  A. All slave units send low level to the second contention bus and the master unit sends periodically host-identifying pulse to the second contention bus according to its number;
  B. Each module detects the feedback pulse from the second contention bus and records the pulse width Tr in real time;
  C. As described in the first logic, if the feedback level from the first contention bus detected by the module that has started up is high and the module is set as a master unit, the second contention logic process will be performed. Here, if the feedback pulse width Tr from the second contention bus is smaller than the host-releasing pulse width of the module Tw, the module remains as the master unit. Otherwise, it means that more than one master unit exist in the system and a master unit having a number with higher priority than the module exists. Therefore, the module is released from the master state and reset as a slave unit.

The above-described first and second contention buses supplement with each other, while the major function of the two buses is somewhat different. So long as there is no master unit in the parallel system at any time, the module that has started up may recognize the situation through the first contention bus and set itself as the master unit. However, there may be a possibility that a number of modules start up at the same time and contend for the master unit simultaneously. Contention risk may occur due to the delay of the level signal sent and received on the first contention bus, thereby creating more than one master unit. Although such a possibility is rare, some measures need to be taken to overcome the defect in consideration of the damage to the parallel system that may be caused by multiple master units.

The second contention logic is used to ensure the uniqueness of the master unit. In case more than one master unit come up in the parallel module system, all master units send corresponding host-identifying pulses to the second contention bus. By detecting the feedback pulse width on the second contention bus, the master unit having a number with lower priority will be released from the master state.

In order to ensure the reliability of the aforesaid contention device, the definition of the host-identifying pulse width and the host-releasing pulse width should comply with certain rules. Take a parallel module system comprising four modules as an example, the number of each module is 1, 2, 3, and 4, respectively (as shown in FIG. 5). If module 1 has the highest priority, the host-identifying pulse width and host-releasing pulse width are provided in the following table (The table is intended only as an example and the above pulse width can be selected in a number of ways, wherein the period T of the host-identifying pulse is assumed as 50 timing units).

|  | Module number | | | |
|---|---|---|---|---|
|  | 1 | 2 | 3 | 4 |
| Host-Identifying Pulse Width Ts | 50 | 24 | 12 | 0 |
| Host-Releasing Pulse Width Tw | None | 44 | 18 | 6 |

The definition of the host-identifying pulse width satisfies the following relation: $50>=Ts1>Ts2+Ts3+Ts4$; $Ts2>Ts3+Ts4$; $Ts3>Ts4$. Preferably, the above values may have even intervals therebetween to improve the ability of anti-interference.

The definition of the host-releasing pulse width satisfies the following relation: $Tw2>Ts2+Ts3+Ts4$; $Tw3>Ts3+Ts4$; $Tw4>Ts4$. Preferably, the above values may have even intervals therebetween to improve the ability of anti-interference.

The reason behind the rules and definitions of the host-identifying pulse width Ts and the host-releasing pulse width Tw lies in that when multiple modules send host-identifying pulses to the second contention bus at the same time, the pulses may be completely overlapped, completely staggered or partly overlapped since there is no consistent relationship of synchronization between the pulses from all the modules.

For instance, when modules 2, 3, and 4 are master units at the same time, module 3 and 4 need to be released from the master state and module 2 should remain as the master unit. Here, the host-identifying pulse width sent to the second contention bus from the modules 2, 3 and 4 is 24, 12 and 0, respectively. The feedback pulse width Tr on the second contention bus is between 24 (completely overlapped) and 36 (completely staggered). According to the second contention logic, the following result can be obtained:
  Module 2: Tr<Tw2 (44), the master state remains
  Module 3: Tr>Tw3 (18), the master state is released
  Module 4: Tr>Tw2 (6), the master state is released As seen above, the result of the contention logic corresponds to the desired target. Similarly, when the master unit contention risk appears in other combinations, the master unit establishing process is still reliable.

In the above embodiment, the master unit contention time is approximately 0 and the release time is about 50 timing units when multiple master units exist.

Figure 7:
FIG. 7 is a schematic diagram of the construction of the single contention bus in accordance with the second and third embodiments of the present invention.

As the second embodiment (FIG. 7), the above-described master-slave contention bus is composed of only one logical OR bus in the multi-string parallel signal cable, in which the master-slave logic is as follows:
(1) Initial state: Each module is initially defaulted as a slave unit and sends an invalid low level to the master-slave contention bus.
(2) Master-Slave contention logic:
  Same as in the first embodiment, according to the respective module numbers, the modules have two types of characteristic pulse—host-identifying pulse and host-releasing pulse with the respective width of Ts and Tw. Both have a period of T. In addition, a fixed master unit existence pulse width Tk is set to indicate that a master unit exists in the parallel system.

A. Each module that has not started up or been turned off are set as a slave unit;
B. The slave unit sends a low level to the contention bus, while the master unit sends periodically a host-identifying pulse to the contention bus according to its number;
C. Each module constantly detects the feedback pulse width Tr from the contention bus with a period of T.
D. If the module that has started up detects that the feedback pulse width Tr<=Tk, the module is set as a master unit; if it detects that the feedback pulse width Tr>Tk and the module is a slave unit, the module remains as a slave unit; if it detects that the feedback pulse width Tr>Tk while the module is a master unit, and if Tr<Tw, the moduleremains as a master unit. Otherwise, it means that more than one master unit exist in the system and a master unit having a number with higher priority than the number of the module exists. Thus, the module is released from the master state and set as a slave unit.

The master-slave device in the second embodiment can also ensure the existence and uniqueness of the master unit. Nonetheless, the host-identifying pulse Ts of each module must be larger than Tk (Tk>0). Take the aforesaid parallel module system comprising four modules as an example, the host-identifying pulse width and host-releasing pulse width of each module are provided in the following table (the table is intended only as an example for selecting the above pulse width, wherein T is assumed as 50 timing units and Tk is set at 3 timing units).

|  | Module number |  |  |  |
| --- | --- | --- | --- | --- |
|  | 1 | 2 | 3 | 4 |
| Host-Identifying Pulse Width Ts | 50 | 24 | 12 | 5 |
| Host-Releasing Pulse Width Tw | None | 46 | 20 | 8 |

The definition of the host-identifying pulse width Ts satisfies the following relation: 50>=Ts1>Ts2+Ts3+Ts4; Ts2>Ts3+Ts4; Ts3>Ts4; Ts4>Tk. Preferably, the above values may have even intervals therebetween to improve the ability of anti-interference.

The definition of the host-releasing pulse width Tw satisfies the following relation: Tw2>Ts2+Ts3+Ts4; Tw3>Ts3+Ts4; Tw4>Ts4. Preferably, the above values may have even intervals therebetween to improve the ability of anti-interference.

Similarly, the definition of the host-identifying pulse width Ts and the host-releasing pulse width Tw has taken into account the fact that various overlapping situations between the respective pulses may occur when each of the modules sends the host-identifying pulse to the master-slave contention bus at the same time. In the second embodiment, the maximum value of the contention time of the master unit and the releasing time when multiple master units occur are about 50 timing units.

In the above-described first embodiment and second embodiment, the master-slave contention logic comprises a contention process and a releasing process, which is for ensuring the existence and uniqueness of the master unit respectively.

In another embodiment in accordance with the present invention, the contention process and the release process are combined into one process, which can ensure the existence and the uniqueness of the master unit simultaneously.

Here, the master-slave contention bus is composed of only one logical OR bus in the multi-string parallel signal cable and the master-slave logic is as follows:
(1) Initial state: Each module is initially defaulted as a slave unit.
(2) Master-Slave contention logic:
Similarly, according to the respective module numbers, the modules have two types of characteristic pulses—host-identifying pulse and host-releasing pulse with the respective width of Ts and Tw. Both have a period of T.
A. All modules that have not started up send invalid low levels to the master-slave contention bus and are set as slave units;
B. Each started module sends host-identifying pulse to the master-slave contention bus;
C. Each module constantly detects the feedback pulse width Tr from the master-slave contention bus at a period of T. If the feedback pulse Tr is less than its host-releasing pulse Tw, the module is set as a master unit. If the feedback pulse Tr is larger than its host-releasing pulse Tw, the module is set as a slave unit.

In order to ensure the reliability of the aforesaid contention device, the definition of the host-identifying pulse width and the host-releasing pulse width should comply with certain rules. Take a parallel module system comprising four modules as an example, the number of each module is 1, 2, 3, and 4, respectively. If module 1 has the highest priority, the host-identifying pulse width and host-releasing pulse width are provided in the following table (the table is intended only as an example and the above pulse width can be selected in a number of ways, wherein the period T of the host-identifying pulse is assumed as 50 timing units).

|  | Module number |  |  |  |
| --- | --- | --- | --- | --- |
|  | 1 | 2 | 3 | 4 |
| Host-Identifying Pulse Width Ts | 48 | 24 | 12 | 4 |
| Host-Releasing Pulse Width Tw | 52 | 44 | 20 | 8 |

The definition of the host-identifying pulse width Ts satisfies the following relation: Ts1>Ts2+Ts3+Ts4; Ts2>Ts3+Ts4; Ts3>Ts4. Preferably, the above values may have even intervals therebetween to improve the ability of anti-interference.

The definition of the host-releasing pulse width Tw satisfies the following relation: Tw1>Ts1 +Ts2+Ts3+Ts4; Ts1>Tw2>Ts2+Ts3+Ts4; Ts2>Tw3>Ts3+Ts4; Ts3>Tw4>Ts4. Preferably, the above values may have even intervals therebetween to improve the ability of anti-interference.

Here, the definition of the host-identifying pulse width Ts and the host-releasing pulse width also take into account the possible situations of complete overlapping, complete staggering or partly overlapping of the pulses, which may occur when more than one modules send the host-identified pulse to the master-slave contention bus at the same time. In this embodiment, both the maximum value of contention time of the master unit and the releasing time when the multiple master units exist are about 50 timing units. However, the difference lies in that the module that starts up late having a number with higher priority may preempt the master state of the module that starts up earlier having a number with lower priority.

The master-slave contention device can be realized by the digital circuit, such as triggers based circuits, or microprocessor and programmable logic device, wherein the master-slave contention bus may be a simple OR structure or modified logical OR structure, and may also represent as AND logic structure in a negative logic method.

The application of the master-slave contention device in accordance with the present invention should not be limited to the parallel module system, and may cover other decentralized parallel systems. Each module of the parallel module system is characterized by having their outputs connected together, such as the modules in the parallel UPS system. The master unit can control the frequency source of the output voltage of the entire parallel module system under certain conditions, and the slave units track the phase of the output voltage of the master unit. The master unit can also be used for the time sequential control and the synchronization of switching periods of the parallel module system, etc.

The invention claimed is:

1. A method for establishing a master unit in a parallel system including multiple modules connected in parallel, characterized in that each module in said parallel system is marked with a respective number and connected through at least one contention bus, wherein the modules with said respective numbers have different host-identifying pulse width (Ts) and host releasing pulse width (Tw); each of said modules sending the corresponding host-identifying pulse to said contention bus according to its number and receiving a feedback pulse from said contention bus at the same time; and one of said modules being established as a master unit by comparing its received feedback pulse width (Tr) with its host-releasing pulse width (Tw).

2. The method of claim 1, characterized in that said contention bus is a logic OR bus, each of said modules being initially defaulted as a slave unit, and each of said modules sending an invalid low level to said contention bus.

3. The method of claim 2, characterizedin that each of said modules sends a host-identifying pulse to said contention bus to ensure the uniqueness of the master unit, comprising the following steps: setting any of the modules that has not started or been turned off as a slave unit; the module that has started sending its host-identifying pulse to said contention bus and detecting the feedback pulse width (Tr); setting the module as master unit if the feedback pulse width (Tr) is smaller than its host-releasing pulse width (Tw); and setting the module as the slave unit if the feedback pulse width (Tr) is larger than its host-releasing pulse width (Tw).

4. The method of claim 1, characterized in that said contention bus comprises a first contention bus and a second contention bus, each of said modules being initially defaulted as a slave unit, and each of said modules sending an invalid low level to said first and second contention buses.

5. The method of claim 4, characterized in that each of said modules sends a low level to the first contention bus in order to ensure the existence of the master unit, comprising the following steps: setting any of the modules that has not started up or been turned off as a slave unit; all the modules that act as slave units sending low levels to said first contention bus, while the module that serves as the master unit sending a high level to said first contention bus; each of said modules that has started detecting the feedback pulse from said first contention bus, and setting the module as the master unit if the feedback level is low; maintaining the module as the slave unit if the feedback level is high and the module is a slave unit; if the feedback level is high and the module is set as a master unit, each of said modules performing a further step to send the corresponding host-identifying pulse to the second contention bus to ensure that the master unit is unique.

6. The method of claim 5, characterized in that each of said modules sends its host-identifying pulse to the second contention bus in order to ensure the uniqueness of the master unit, comprising the following steps: all of the modules that act as slave units sending low levels to said second contention bus, while the module that serves as the master unit sending a periodical host-identifying pulse to said second contention bus according to its number; each of said modules detecting the feedback pulse from said second contention bus and recording the feedback pulse width (Tr) in real time; if the feedback level from said first contention bus detected by said each module is high and the module is set as a master unit, and if the feedback pulse width (Tr) from the second contention bus is smaller than the host-releasing pulse width (Tw) of the module, maintaining the module as the master unit; otherwise releasing the module from the master state and setting the module as a slave unit.

7. The method of claim 6, characterized in that said first contention bus and said second contention bus are simple logic OR bus or simple AND bus.

8. The method of claim 7, characterized in that each of said modules sends logic level to said first contention bus by using a first contention logic associated with said first contention bus; each of said modules sends the host-identifying pulse to said second contention bus and detects said second contention bus by using a second contention logic associated with said second contention bus; said first contention logic and said second contention logic can be realized by a digital circuits, such as a trigger based circuits, or a microprocessor and programmable logic device.

9. The method of any of claim 1–8, characterized in that the number of each of said modules corresponds to a priority; the host-identifying pulse width (Ts) of the module with a high priority is larger than the sum of the host-identifying pulse width (Ts) of the modules with lower priorities, and is larger than the host-releasing pulse width (Tw) of any of the modules with a lower priority; the host-releasing pulse width (Tw) of each module other than the one with the highest priority is larger than the host-identifying pulse width (Ts) of the module, at the same time, the host-releasing pulse width (Tw) is larger than the host-releasing pulse width (Tw) of the modules with lower priorities.

* * * * *